United States Patent
Tang

(10) Patent No.: US 11,470,504 B2
(45) Date of Patent: Oct. 11, 2022

(54) METHOD, USER EQUIPMENT, AND NODE FOR CONTROLLING DATA DUPLICATION AND TRANSMISSION

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 15/930,695

(22) Filed: May 13, 2020

(65) Prior Publication Data

US 2020/0275310 A1    Aug. 27, 2020

Related U.S. Application Data

(63) Continuation of application No. PCT/CN2018/084509, filed on Apr. 25, 2018.

(30) Foreign Application Priority Data

Nov. 15, 2017  (WO) ............... PCT/CN2017/111022
Nov. 16, 2017  (WO) ............... PCT/CN2017/111418
Jan. 8, 2018   (WO) ............... PCT/CN2018/071819

(51) Int. Cl.
   *H04W 28/06*    (2009.01)
   *H04W 28/02*    (2009.01)
   (Continued)

(52) U.S. Cl.
   CPC ........... *H04W 28/06* (2013.01); *H04L 1/1614* (2013.01); *H04W 28/0257* (2013.01); *H04W 80/08* (2013.01); *H04W 84/20* (2013.01)

(58) Field of Classification Search
   None
   See application file for complete search history.

(56) References Cited

U.S. PATENT DOCUMENTS

2015/0092707 A1*   4/2015   Kwon ................... H04L 5/0098
                                                              370/329
2017/0222876 A1    8/2017   Van Der Velde et al.

FOREIGN PATENT DOCUMENTS

CN    104754521 A    7/2015
CN    105144833 A    12/2015
(Continued)

OTHER PUBLICATIONS

Ericsson, Data duplication in lower layers (HARQ), R2-1702032, 3GPP TSG-RAN WG2 #97, Athens, Greece, Feb. 13-17, 2017.
(Continued)

*Primary Examiner* — Peter Chen
*Assistant Examiner* — Jeff Banthrongsack
(74) *Attorney, Agent, or Firm* — Perkins Coie LLP

(57) ABSTRACT

The present disclosure relates to a method, user equipment, a node and a computer readable medium for controlling data duplication transmission function. The method can include: receiving first control information sent from a master node, and/or receiving second control information sent from a secondary node; and determining, based on an indication of a first quantity of data radio bearers (DRB) corresponding to the first control information, and/or based on an indication of a second quantity of DRBs corresponding to the second control information, to open or close a data duplication transmission function of at least one DRB.

12 Claims, 6 Drawing Sheets

---

Receive first control information sent from a master node, and/or receive second control information sent from a secondary node — 101

Determine, based on an indication of a first quantity of data radio bearers (DRB) corresponding to the first control information, and/or based on an indication of a second quantity of DRBs corresponding to the second control information, to open or close a data duplication transmission function of at least one DRB — 102

(51) Int. Cl.
   *H04W 80/08* (2009.01)
   *H04L 1/16* (2006.01)
   *H04W 84/20* (2009.01)

(56) References Cited

FOREIGN PATENT DOCUMENTS

| | | | | |
|---|---|---|---|---|
| CN | 105557007 A | | 5/2016 | |
| CN | 106332046 A | | 1/2017 | |
| CN | 106407040 A | | 2/2017 | |
| CN | 107015883 A | | 8/2017 | |
| CN | 107147479 A | | 9/2017 | |
| CN | 107291560 A | | 10/2017 | |
| CN | 107342851 A | * | 11/2017 | ............ H04W 76/15 |
| CN | 107342851 A | | 11/2017 | |
| EP | 3641188 A1 | | 4/2020 | |
| RU | 2603626 C2 | | 11/2016 | |
| WO | 2016197989 A1 | | 12/2016 | |

OTHER PUBLICATIONS

International Application No. PCT/CN2018/084509, International search report, dated Aug. 21, 2018, 2 pages.
International Application No. PCT/CN2018/071819, International search report, dated Aug. 6, 2018, 1 pages.
International Application No. PCT/CN2017/111418, International search report, dated Apr. 28, 2018, 3 pages.
TSG RAN WG1, "Status Report to TSG; RP-171783", 3GPP TSG RAN meeting #77, Sep. 11-14, 2017, pp. 70-73 and 84.
3rd Generation Partnership Project; Technical Specification Group Radio Access Network; RP-171733, 3GPP TS 38.321 V1.0.0, Sep. 11-14, 2017, entire document.
3rd Generation Partnership Project; Technical Specification Group Radio Access Network; Evolved Universal Terrestrial Radio Access (E-UTRA) and NR; Multi-connectivity; Stage 2(Release 15). RP-171872, TS 37.340 V1.0.0, Sep. 11-14, 2017, entire document.
CIPO, Examination Report for Canadian Patent Application No. 3082722. dated Jun. 14, 2021. 5 pages.
CNIPA, First Office Action for Chinese Patent Application No. 202010256281.2. dated May 24, 2021. 27 pages with English translation.
ETSI MCC, "Report of 3GPP TSG RAN WG2 NR AdHoc#2 meeting, Qingdao, China" 3GPP TSG-RAN WG2 meeting #99, R2-1707602, Berlin, Germany, Aug. 21-25, 2017. 34 pages.
Rospatent, Office Action received for Russian Patent Application No. 2020119163. dated May 28, 2021. 14 pages with English translation.
3GPP TSG-RAN WG2 meeting #99 Berlin, Germany, Aug. 21-25, 2017—R2-1707602—ETSI MCC, Report of 3GPP TSG RAN WG2 NR AdHoc#2 meeting, Qingdao, China Jun. 27-29, 2017 (106 pages).
European Search Report dated Nov. 20, 2020 of European Patent Application No. 18877482.2 (11 pages).
CNIPA, Second Office Action for Chinese Patent Application No. 202010256281.2. dated Aug. 20, 2021. 26 pages with English translation.
EPO, Examination Report for European Patent Application No. 18877482.2. dated Jun. 28, 2021. 7 pages.
Huawei et al. "Design of MAC CE for duplicate activation/deactivation" R2-1707712; 3GPP TSG RAN WG2 #99; Berlin, Germany; Aug. 21-25, 2017. 3 pages.
IPI, Examination Report for Indian Patent Application No. 202017025001. dated Jul. 20, 2021. 6 pages with English translation.
RAN2 Chairman (Intel) "Chairman Notes" 3GPP TSG-RAN WG2 Meeting #99bis; Prague, Czech Republic, Oct. 9-13, 2017. 3 pages.
Examination Report for European Application No. 18877482.2 dated Nov. 9, 2021. 8 pages.
Third Office Action for Chinese Application No. 202010256281.2 dated Nov. 29, 2021. 11 pages with English translation.
Catt "Remaining issues for duplication/split bearer" R2-1710310; 3GPP TSG-RAN WG2 #99bis; Prague, CZ; Oct. 9-13, 2017. 6 pages.
Nokia et al. "PDCP data duplication in LTE" R2-1711001; 3GPP TSG-RAN WG2 #99bis Prague, Czech Republic, Oct. 9-13, 2017. 4 pages.
Notice of Reasons for Refusal for Japanese Application No. 2020526949 dated Jan. 7, 2022. 8 pages with English translation.
Notification to Grant Patent for Chinese Application No. 202010256281.2 dated Mar. 2, 2022. 6 pages with English translation.
Samsung "Discussion on Security keys" R2-1708443; 3GPP TSG-RAN WG2 2017 RAN 2 #99 Meeting; Berline, Germany, Aug. 21-25, 2017. 4 pages.
Second Office Action for Canadian Application No. 3082722 dated Mar. 29, 2022. 4 pages.
Vivo "Discussion on the bearer type change of duplicate bearer" R2-1708499; 3GPP TSG-RAN WG2 Meeting #99; Berlin, Germany; Aug. 21-25, 2017. 5 pages.
Examination Report of the European application No. 18877482.2, dated May 3, 2022. 11 pages.
ITRI, "UL Packet Duplication for Split SRB" R2-1706928; 3GPP TSG-RAN WG2 NR Ad Hoc; Qingdao, China, Jun. 27-29, 2017. 2 pages.

* cited by examiner

METHOD, USER EQUIPMENT, AND NODE FOR CONTROLLING DATA DUPLICATION AND TRANSMISSION

CROSS-REFERENCE TO RELATED APPLICATIONS

This application is a continuation of International Patent Application No. PCT PCT/CN2018/084509, filed on Apr. 25, 2018, which claim priority to PCT Patent Application No. PCT/CN2018/071819, filed on Aug. 1, 2018, PCT Patent Application No. PCT/CN2017/111418, filed Nov. 16, 2017, and PCT Patent Application No. PCT/CN2017/111022, filed Nov. 15, 2017, which are each hereby incorporated by reference in their entireties.

TECHNICAL FIELD

The present disclosure relates to the field of communications processing technologies, and in particular, to a method, user equipment (UE), a node, and a computer readable medium for controlling data duplication and transmission.

BACKGROUND

In existing discussion of an NR (new radio), for a radio bearer for which a data duplication transmission function is configured, a data duplication transmission function of a bearer may be activated or deactivated dynamically through a media access control (MAC) control element (CE). In a case of dual connectivity (DC), a master cell group (MCG) and a secondary cell group (SCG) may each send a MAC CE to activate or deactivate a data duplication function of a split bearer of UE.

However, in a DC scenario, a master node of the MCG and a secondary node of the SCG can each send control information. Consequently, a user equipment (UE) side needs to identify specific pieces of control information that are used to control DRBs, to ensure processing efficiency of the UE.

SUMMARY

To resolve the foregoing technical problems, embodiments of the present disclosure provide a method for controlling data duplication and transmission, UE, a node, and a computer readable medium.

An embodiment of the present disclosure provides a method for controlling data duplication and transmission, applied to UE, including:
receiving first control information sent from a master node, and/or receiving second control information sent from a secondary node; and
determining, based on an indication of a first quantity of data radio bearers (DRB) corresponding to the first control information, and/or based on an indication of a second quantity of DRBs corresponding to the second control information, to open or close a data duplication transmission function of at least one DRB.

An embodiment of the present disclosure provides a method for controlling data duplication and transmission, applied to a network node, including:
determining, based on a preset condition, that a master node sends first control information, and/or that a secondary node sends second control information; and
determining, based on an indication of a first quantity of data radio bearers (DRB) corresponding to the first control information, and/or based on an indication of a second quantity of DRBs corresponding to the second control information, that a terminal device opens or closes a data duplication transmission function of at least one DRB.

An embodiment of the present disclosure provides a method for controlling data duplication and transmission, applied to a master node, including:
negotiating with a secondary node to determine to open or close a data duplication transmission function of at least one data radio bearer of target UE;
determining, based on the negotiation result, that the master node controls the target UE to open or close a data duplication function of a first quantity of data radio bearers of the at least one data radio bearer, and that the secondary node controls the target UE to open or close a data duplication function of a second quantity of data radio bearers of the at least one data radio bearer, where the first quantity of data radio bearers is at least partially different from the second quantity of data radio bearers; and
generating first control information based on the data duplication function of the first quantity of data radio bearers (DRB) that is determined to be opened or closed, and sending the first control information to the target UE.

An embodiment of the present disclosure provides a method for controlling data duplication and transmission, applied to a secondary node, including:
negotiating with a master node to determine whether to open or close a data duplication transmission function of at least one data radio bearer of target UE;
determining, based on the negotiation result, that the master node controls the target UE to open or close a data duplication function of a first quantity of data radio bearers (DRB) of the at least one data radio bearer, and that the secondary node controls the target UE to open or close a data duplication function of a second quantity of data radio bearers of the at least one DRB, where the first quantity of DRBs is at least partially different from the second quantity of DRBs; and
generating second control information based on the data duplication function of the second quantity of DRBs that is determined to be opened or closed, and sending the second control information to the target UE.

An embodiment of the present disclosure provides a UE, including:
a first communications unit, receiving first control information sent from a master node, and/or receiving second control information sent from a secondary node; and
a first processing unit, determining, based on an indication of a first quantity of data radio bearers (DRB) corresponding to the first control information, and/or based on an indication of a second quantity of DRBs corresponding to the second control information, to open or close a data duplication transmission function of at least one DRB.

An embodiment of the present disclosure provides a network node, including:
a fourth communications unit, determining, based on a preset condition, that a master node sends first control information, and/or that a secondary node sends second control information; and a fourth processing unit, determining, based on an indication of a first quantity of data radio bearers (DRB) corresponding to the first control information, and/or based on an indication of a second quantity of DRBs corresponding to the second control information, that a terminal device opens or closes a data duplication transmission function of at least one DRB.

An embodiment of the present disclosure provides a master node, including:

a second communications unit, negotiating with a secondary node to determine to open or close a data duplication transmission function of at least one data radio bearer of target UE, and sending the first control information to the target UE; and a second processing unit, determining, based on the negotiation result, that the master node controls the target UE to open or close a data duplication function of a first quantity of data radio bearers of the at least one data radio bearer, and that the secondary node controls the target UE to open or close a data duplication function of a second quantity of data radio bearers of the at least one data radio bearer, where the first quantity of data radio bearers is at least partially different from the second quantity of data radio bearers, and generating the first control information based on the data duplication function of the first quantity of data radio bearers (DRB) that is determined to be opened or closed.

An embodiment of the present disclosure provides a secondary node, including:

a third communications unit, negotiating with a master node to determine to open or close a data duplication transmission function of at least one data radio bearer of target UE, and sending second control information to the target UE; and a third processing unit, determining, based on the negotiation result, that the master node controls the target UE to open or close a data duplication function of a first quantity of data radio bearers (DRB) of the at least one data radio bearer, and that the secondary node controls the target UE to open or close a data duplication function of a second quantity of data radio bearers of the at least one DRB, where the first quantity of DRBs is at least partially different from the second quantity of DRBs, and generating the second control information based on the data duplication function of the second quantity of DRBs that is determined to be opened or closed.

An embodiment of the present disclosure provides UE, including: a processor, and a memory configured to store a computer program capable of being run on the processor, where:

the processor is configured to perform, when running the computer program, steps of the foregoing method.

An embodiment of the present disclosure provides a master node, including: a processor, and a memory configured to store a computer program capable of being run on the processor, where:

the processor is configured to perform, when running the computer program, steps of the foregoing method.

An embodiment of the present disclosure provides a secondary node, including: a processor, and a memory configured to store a computer program capable of being run on the processor, where:

the processor is configured to perform, when running the computer program, steps of the foregoing method.

An embodiment of the present disclosure provides a computer readable medium, where the computer readable medium stores a computer executable instruction, and the computer executable instruction, when executed, implements steps of the foregoing method.

Technical solutions of embodiments of the present disclosure can enable a UE side to determine, based on the first control information and/or the second control information sent from the master node and/or the secondary node, whether to open or close the data duplication transmission function of the at least one DRB of the UE side. In this way, in a dual-connectivity scenario, after it is determined that control information sent from the two nodes is received, the UE may determine the DRBs whose data duplication transmission functions are opened, thereby ensuring processing efficiency of the UE.

DETAILED DESCRIPTION

For characteristics and technical content of embodiments of the present disclosure to be known in a more detailed manner, the following describes implementation of the embodiments of the present disclosure in detail with reference to the accompanying drawings. The provided accompanying drawings are only for reference and description, and are not intended to limit the embodiments of the present disclosure.

Embodiment 1

Figure 1:
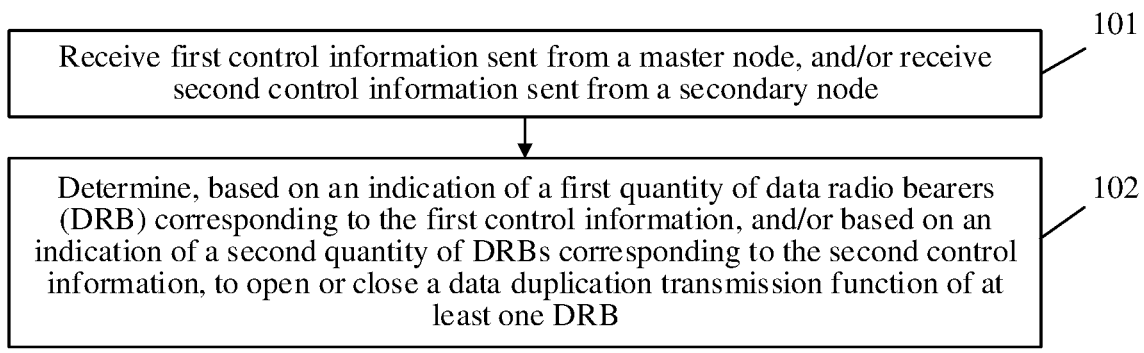
FIG. 1 is a schematic flowchart 1 of a method for controlling data duplication and transmission according to some embodiments.

An embodiment of the present disclosure provides a method for controlling data duplication and transmission, applied to UE. As shown in FIG. 1, the method includes:

In step 101, receiving first control information sent from a master node, and/or receiving second control information sent from a secondary node; and In step 102, determining, based on an indication of a first quantity of data radio bearers (DRB) corresponding to the first control information, and/or based on an indication of a second quantity of DRBs corresponding to the second control information, to open or close a data duplication transmission function of at least one DRB.

Here, the master node may be a node in a master cell group (MCG), and the secondary node may be a node in a secondary cell group (SCG).

In the foregoing step 101, the receiving first control information sent from a master node, and/or receiving second control information sent from a secondary node includes:

receiving the first control information with a bitmap format sent from the master node; and/or receiving the second control information with the bitmap format sent from the secondary node.

Control information of the master node and control information of the secondary node could be received simultaneously or separately. The order of receiving the first control information and the second control information is not limited herein.

In a network side, a master node of the MCG cooperates with a secondary node of the SCG by using an Xn interface to determine a network node that controls opening or closing of a data duplication function of a DRB of the UE.

Further, the first quantity of DRBs indicated by the first control information is determined based on a correspondence between the first control information with a bitmap format and identification information of a DRB; and/or the second quantity of DRBs indicated by the second control information is determined based on a correspondence between the second control information with a bitmap format and identification information of a DRB.

For example, if the first control information with the bitmap format includes 8 bits, each bit may correspond to identification information of one DRB. Assuming that bits 1 to 3 may respectively correspond to DRBs 1, 4 and 7, and the remaining bits 4 to 8 are invalid bits, it may be determined that the first control information indicates opening or closing of which DRB by using the bitmap. Still further, a bit in a bitmap may be set as 0, which means to close a data duplication transmission function of a DRB. If a bit is 1, it means to open the data duplication transmission function of the DRB. Certainly, the setting may be further opposite and examples are not fully listed in this embodiment.

In addition, bits 1 to 3 in a bitmap of the second control information may respectively correspond to DRBs whose identifiers are 1, 3, and 7, and the remaining bits may be invalid bits. Meanings of the bits are the same as those in the foregoing setting manner, and details are not described herein again.

The DRB includes three types: an MCG bearer, an SCG bearer and a Split bearer. A media access control (MAC) control element (CE) sent by a master node (MN) is responsible for controlling opening or closing of data duplication functions of the MCG bearer and the Split bearer. A MAC CE sent by a secondary node (SN) is responsible for controlling opening or closing of data duplication functions of the SCG bearer and the Split bearer.

When the foregoing step 102, that is, determining, based on an indication of a first quantity of data radio bearers (DRB) corresponding to the first control information, and/or based on an indication of a second quantity of DRBs corresponding to the second control information, to open or close a data duplication transmission function of at least one DRB, is operated, three factors may be considered for how to control:

First Factor:

When the first quantity of DRBs corresponding to the first control information includes a first DRB used as a master cell bearer, it is determined to open or close a data duplication transmission function of the first DRB based on an indication of the first control information; and/or when the second quantity of DRBs corresponding to the second control information includes a second DRB used as a secondary cell bearer, it is determined to open or close a data duplication transmission function of the second DRB based on an indication of the second control information.

It should be noted that, the first DRB is not included in the second quantity of DRBs, and the second DRB is not included in the first quantity of DRBs.

In other words, non-split bearers, that is, non-split bearers (for example, may be the MCG bearer (the first DRB) and the SCG bearer (the second DRB)), are not controlled by opposite ends. For example, a MAC CE of the MCG controls the MCG bearer, and a MAC CE of the SCG controls the SCG bearer.

It should be understood that, quantities of first DRBs and second DRBs are not limited in this embodiment. There may be one or more first DRBs and second DRBs in reality, and the quantities of the first DRBs and the second DRBs may be different.

Second Factor:

When the first quantity of DRBs corresponding to the first control information includes a third DRB used as a split bearer, and/or when the second quantity of DRBs corresponding to the second control information includes a third DRB used as a split bearer, it is determined to open or close a data duplication transmission function of the third DRB based on a preset condition.

The split bearer, that is, the third DRB, may be the Split bearer, and the third DRB may be controlled by the MCG or the SCG.

Specifically, the preset condition may include at least one of the following:

Condition 1: Determining, based on a group in which a PDCP (packet data convergence protocol) of the third DRB is located, control information sent from a node corresponding to the group to control opening or closing of a data duplication transmission function of the third DRB.

A group in which the PDCP of the third DRB is located may be determined according to a key value of the third DRB. In other words, the key value corresponding to the third DRB is obtained, and the group in which the PDCP of the third DRB is located is determined based on the key value corresponding to the third DRB.

For example, if a PDCP of a split bearer is in the MCG, the MAC CE of the MCG controls the split bearer. UE may distinguish whether the PDCP of the split bearer is in the MCG or the SCG by using different key values of split bearers. Different groups may correspond to different key values, and a setting manner of the key values may be determined in advance through a negotiation between the network side and UE side. For example, in dual connectivity (DC), a key value of a split bearer may be KeNB or S-KgNB, and the UE can distinguish whether a PDCP is in the MCG or the SCG by identifying the two key values. Specifically, KeNB may be a key corresponding to the MCG, and S-KgNB may be a key corresponding to the SCG.

Condition 2: Determining, based on a default transmission path corresponding to the third DRB, control information sent from a control node outside the default transmission path to control opening or closing of the data duplication transmission function of the third DRB.

The default transmission path is a path used when the data duplication transmission function is in a deactivated state.

For example, a non-default leg and a default leg of a split bearer (that is, the third DRB) refer to default transmission paths used after duplication is deactivated. A node corresponding to the non-default leg may be used to control the duplication.

Condition 3: Determining, based on a PDCP version of the third DRB, control information sent from a node corresponding to the PDCP version to control opening or closing of the data duplication transmission function of the third DRB.

The PDCP version of the third DRB is one of the following: a long-term evolution (LTE) PDCP version, and a new radio (NR) PDCP version.

A split bearer is controlled in dependence on a PDCP version of the split bearer. For example, a MAC CE of an LTE side can only control a split bearer whose PDCP is an LTE PDCP, and a MAC CE of an NR side can only control a split bearer whose PDCP is an NR PDCP.

It should be understood that, the first factor, the second factor and the three conditions in the second factor may be combined to perform determination. Combinations are not fully listed in this embodiment, and all types of combinations fall within the protection scope of this embodiment.

A solution provided in this embodiment is described below by using examples:

DRBs correspond to a bitmap of the MAC CE in ascending or descending order of IDs of the DRBs.

For example, DRBs whose IDs are 1, 3, 4, and 7 of the UE each have a PDCP data duplication transmission function, where the DRB whose ID is 1 is the MCG bearer, the DRB whose ID is 3 is the SCG bearer, and the DRBs whose IDs are 4 and 7 are split bearers.

Through cooperation, the MCG and the SCG in the network side may determine that the DRBs whose IDs are 1, 4, and 7 respectively correspond to bits 1, 2, and 3 in the bitmap of the MAC CE sent by the MN, where the remaining bits 4, 5, 6, 7, and 8 are invalid bits, and that the DRBs whose IDs are 3, 4, and 7 respectively correspond to bits 1, 2, and 3 in the bitmap of the MAC CE sent by the SN, where the remaining bits 4, 5, 6, 7, and 8 are invalid bits.

Correspondingly, a MAC layer of the UE receives the first control information and/or the second control information sent by a network (which may be the master node in the MCG or the secondary node in the SCG) to open or close the data duplication transmission function of the at least one DRB.

The MAC layer of the UE indicates, to PDCP layers of corresponding DRBs, corresponding bits in the bitmap of the MAC CE controlled by the received duplicated data.

The MAC layer of the UE finds out, based on a correspondence between the bitmap and IDs of DRBs, the bits in the bitmap corresponding to the IDs of the DRBs. For example, DRBs whose IDs are 1, 4, and 7 of the UE respectively correspond to bits 1, 2, and 3 in the bitmap of the MAC CE of the MN. After receiving the bitmap of the MAC CE, the MAC CE indicates a value of the first bit to a PDCP of the DRB whose ID is 1, a value of the second bit to a PDCP of the DRB whose ID is 3, and so on.

The foregoing processing manner in this embodiment is specific to how to determine, according to a relationship between a DRB and control information after control information is received, control information to which a DRB corresponds, for example, how to decide, when a DRB receives the first control information and the second control information, on control information which is to be used to perform subsequent processing.

In addition, this embodiment may further provide another processing manner, that is, which DRB obtains which control information is determined in advance according to a preset rule. In this processing manner, the network side may only send one piece of control information for one DRB. The specific processing manner is as follows:

Which control information corresponds to each of the at least one DRB of the UE is described, which may be determining, according to a preset rule, that each of the at least one DRB corresponds to first control information or second control information.

Specifically, it may be understood that different pieces of identification information of DRBs correspond to which bit in the first control information or the second control information.

The preset rule includes at least one of the following:

when a DRB is a master cell bearer, the DRB is included in a first quantity of DRBs corresponding to the first control information; and when a DRB is a secondary cell bearer, the DRB is included in a second quantity of DRBs corresponding to the second control information.

In other words, when a DRB is the master cell bearer, identification information of the DRB corresponds to a first bit in the first control information; and when a DRB is the secondary cell bearer, identification information of the DRB corresponds to a second bit in the second control information. The first bit and the second bit do not actually represent specific bits in the control information. However, it merely means that the first bit is different from the second bit. Actually, the first bit may be bit 3 in the first control information, and the second bit may be bit 1 in the second control information.

Moreover, when the DRB is the master cell bearer, the DRB does not correspond to the second control information and is not included in the second quantity of DRBs; and when the DRB is the secondary cell bearer, the DRB does not correspond to the first control information and is not included in the first quantity of DRBs.

When the DRB is the master cell bearer, the DRB is not included in the second quantity of DRBs; and when the DRB is the secondary cell bearer, the DRB is not included in the first quantity of DRBs.

The preset rule further includes at least one of the following:

when a PDCP version of a DRB is a first version, the DRB is included in the first quantity of DRBs corresponding to the first control information; and when a PDCP version of a DRB is a second version, the DRB is included in the second quantity of DRBs corresponding to the second control information.

The first version is different from the second version, and the first version and the second version are each one of an LTE PDCP version and an NR PDCP version. In other words, when the first version is an LTE PDCP, the second version is an NR PDCP; or when the first version is the NR PDCP, the second version is the LTE PDCP.

It should be further noted that, when a PDCP version of a DRB is the second version, the DRB is not included in the first quantity of DRBs; and when a PDCP version of a DRB is the first version, the DRB is not included in the second quantity of DRBs.

The preset rule further includes at least one of the following:

when a PDCP of a DRB uses a master cell group key, the DRB is included in the first quantity of DRBs corresponding to the first control information; and when a PDCP of a DRB uses a secondary cell group key, the DRB is included in the second quantity of DRBs corresponding to the second control information.

When a PDCP of a DRB uses the master cell group key, the DRB is not included in the second quantity of DRBs corresponding to the second control information; and when a PDCP of a DRB uses the secondary cell group key, the DRB is not included in the first quantity of DRBs corresponding to the first control information.

The preset rule further includes at least one of the following:

when a DRB is a split bearer, determining, based on a group in which a PDCP of the DRB is located, control information sent from a node corresponding to the group in which the PDCP is located to control the DRB, where it should be understood that the node may be a master node or a secondary node, and the control information may be one of the first control information and the second control information;

when a DRB is the split bearer, determining, based on a default transmission path corresponding to the DRB, control information sent from a node outside the default transmission path to control the DRB, where it should be understood that the node may be a master node or a secondary node, and the control information may be one of the first control information and the second control information;

when a DRB is the split bearer, determining, based on a default transmission path corresponding to the DRB, control information sent from a node of the default transmission path to control the DRB, where it should be understood that the node may be a master node or a secondary node, and the control information may be one of the first control information and the second control information;

when a DRB is the split bearer, determining, based on a PDCP version of the DRB, control information sent from a node corresponding to the PDCP version to control the DRB, where it should be understood that the node may be a master node or a secondary node, and the control information may be one of the first control information and the second control information; and when a DRB is the split bearer, determining, based on an air interface type of a node, control information sent from a node with a specific air interface type to control the DRB, where the air interface type of the node may be an LTE node or an NR node. Correspondingly, it may be understood that an LTE node is preset as the node with the specific air interface type, or an NR node is preset as the node with the specific air interface type. Through this rule, if two nodes both send control information, the UE may know a node whose control information is used to perform subsequent processing.

When a DRB is the split bearer, it is determined, based on a group in which a PDCP of the DRB is located, that control information sent from a node corresponding to a group in which the DRB is not located cannot control the DRB.

When a DRB is the split bearer, it is determined, based on a default transmission path corresponding to the DRB, that control information sent from a node of the default transmission path cannot control the DRB.

When a DRB is the split bearer, it is determined, based on a PDCP version of the DRB, that control information sent from a node that does not correspond to the PDCP version cannot control the DRB.

It can be seen that by using the foregoing solution, the UE side may determine, based on the first control information and/or the second control information sent from the master node and/or the secondary node, whether to open or close the data duplication transmission function of the at least one DRB of the UE side. In this way, in a dual-connectivity scenario, after it is determined that control information sent from the two nodes is received, the UE may determine the DRBs whose data duplication transmission functions are opened, thereby ensuring processing efficiency of the UE.

Embodiment 2

Figure 2:
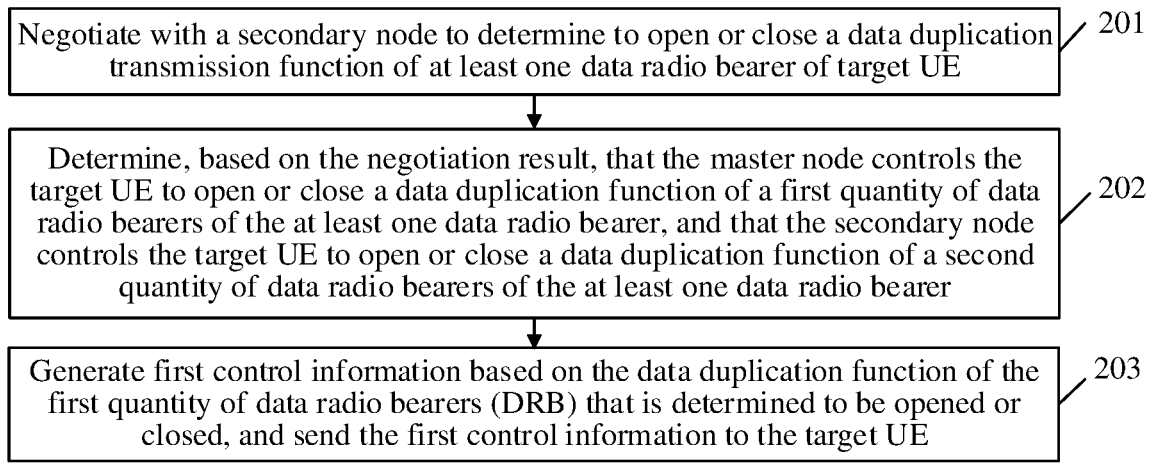
FIG. 2 is a schematic flowchart 2 of a method for controlling data duplication and transmission according to some embodiments.

An embodiment of the present disclosure provides a method for controlling data duplication and transmission, applied to a master node. As shown in FIG. 2, the method includes:

In step 201, negotiating with a secondary node to determine to open or close a data duplication transmission function of at least one data radio bearer of target UE;

In step 202, determining, based on the negotiation result, that the master node controls the target UE to open or close a data duplication function of a first quantity of data radio bearers of the at least one data radio bearer, and that the secondary node controls the target UE to open or close a data duplication function of a second quantity of data radio bearers of the at least one data radio bearer, where the first quantity of data radio bearers is at least partially different from the second quantity of data radio bearers; and In step 203, generating first control information based on the data duplication function of the first quantity of data radio bearers (DRB) that is determined to be opened or closed, and sending the first control information to the target UE.

Here, the master node may be a node in a master cell group (MCG), and the secondary node may be a node in a secondary cell group (SCG).

In a network side, a master node of the MCG may negotiate with a secondary node of the SCG by using an Xn interface to determine a network node that controls opening or closing of data duplication functions of one or more DRBs of the UE.

Further, the generating first control information based on the data duplication function of the first quantity of DRBs that is determined to be opened or closed includes:

obtaining a correspondence between identification information of a DRB and a data bit in a bitmap; and generating, by setting a data bit corresponding to identification information of the first quantity of DRBs in the bitmap, the first control information.

The first quantity of DRBs indicated by the first control information is determined based on a correspondence between the first control information with a bitmap format and identification information of a DRB; and/or the second quantity of DRBs indicated by the second control information is determined based on a correspondence between the second control information with a bitmap format and identification information of a DRB.

For example, if the first control information with the bitmap format includes 8 bits, each bit may correspond to identification information of one DRB. Assuming that bits 1 to 3 may respectively correspond to DRBs 1, 4 and 7, and the remaining bits 4 to 8 are invalid bits, it may be determined that the first control information indicates opening or closing of which DRB by using the bitmap. Still further, a bit in a bitmap may be set as 0, which means to close a data duplication transmission function of a DRB. If a bit is 1, it means to open the data duplication transmission function of the DRB. Certainly, the setting may be further opposite and examples are not fully listed in this embodiment.

In addition, bits 1 to 3 in a bitmap of the second control information may respectively correspond to DRBs whose identifiers are 1, 3, and 7, and the remaining bits may be invalid bits. Meanings of the bits are the same as those in the foregoing setting manner, and details are not described herein again.

The DRB includes three types: an MCG bearer, an SCG bearer and a Split bearer. A media access control (MAC) control element (CE) sent by a master node (MN) is responsible for controlling opening or closing of data duplication functions of the MCG bearer and the Split bearer. A MAC CE sent by a secondary node (SN) is responsible for controlling opening or closing of data duplication functions of the SCG bearer and the Split bearer.

That the master node negotiates with the secondary node may include:

when a target DRB is a master cell bearer, determining that the master node controls the target DRB by using the first control information, where the target DRB may be understood as any one of a plurality of DRBs of the UE;

when a target DRB is a secondary cell bearer, determining that the secondary node controls the target DRB by using the second control information, where the target DRB may be understood as any one of a plurality of DRBs of the UE; and when a target DRB is used as a split bearer, determining, based on that a node corresponding to a group in which a PDCP of the DRB is located is a master node or a secondary node, that the master node or the secondary node generates control information to control opening or closing of a data duplication function of the target DRB. In other words, whether control information corresponding to a DRB is the first control information sent by the master node or the second control information sent by the secondary node is determined according to a group in which a PDCP of the DRB is located.

When a target DRB is used as the split bearer, it is determined, based on a default transmission path corresponding to the target DRB, that a master node or a secondary node outside the default transmission path generates control information to control opening or closing of a data duplication transmission function of the third DRB. In other words, whether control information corresponding to a DRB is the first control information sent by the master node or the second control information sent by the secondary node is determined according to a default transmission path corresponding to the DRB.

When a target DRB is used as the split bearer, it is determined, based on a PDCP version of the target DRB, that a master node or a secondary node corresponding to the PDCP version generates control information to control opening or closing of a data duplication transmission function of the third DRB by using the control information. In other words, whether control information corresponding to a DRB is the first control information sent by the master node or the second control information sent by the secondary node is determined according to a PDCP version of the DRB.

A solution provided in this embodiment is described below by using examples:

DRBs correspond to a bitmap of the MAC CE in ascending or descending order of IDs of the DRBs.

For example, DRBs whose IDs are 1, 3, 4, and 7 of the UE each have a PDCP data duplication transmission function, where the DRB whose ID is 1 is the MCG bearer, the DRB whose ID is 3 is the SCG bearer, and the DRBs whose IDs are 4 and 7 are split bearers.

Through cooperation, the MCG and the SCG in the network side may determine that the DRBs whose IDs are 1, 4, and 7 respectively correspond to bits 1, 2, and 3 in the bitmap of the MAC CE sent by the MN, where the remaining bits 4, 5, 6, 7, and 8 are invalid bits, and that the DRBs whose IDs are 3, 4, and 7 respectively correspond to bits 1, 2, and 3 in the bitmap of the MAC CE sent by the SN, where the remaining bits 4, 5, 6, 7, and 8 are invalid bits.

It can be seen that by using the foregoing solution, the UE side may determine, based on the first control information and/or the second control information sent from the master node and/or the secondary node, whether to open or close the data duplication transmission function of the at least one DRB of the UE side. In this way, in a dual-connectivity scenario, after it is determined that control information sent from the two nodes is received, the UE may determine the DRBs whose data duplication transmission functions are opened, thereby ensuring processing efficiency of the UE.

Embodiment 3

Figure 3:
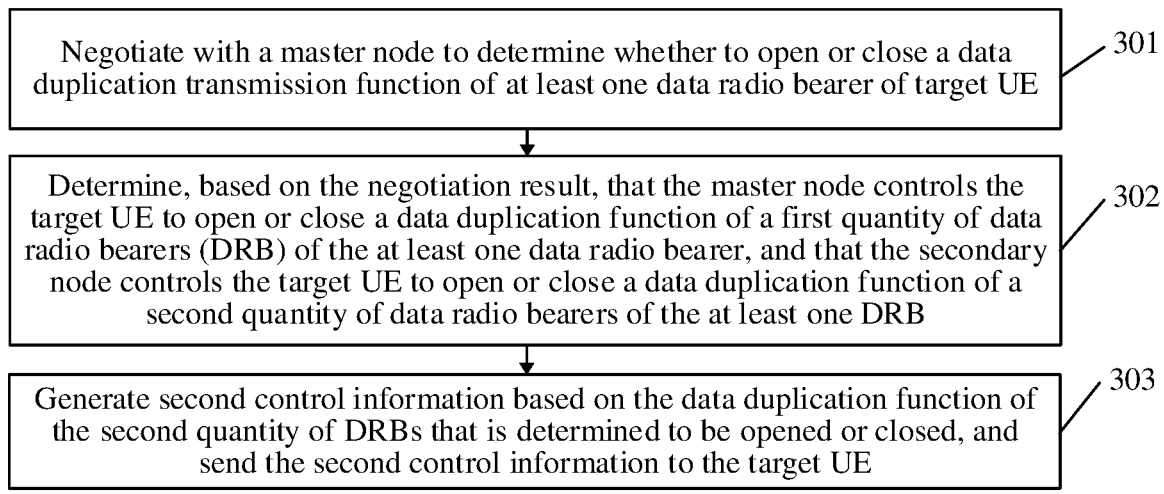
FIG. 3 is a schematic flowchart 3 of a method for controlling data duplication and transmission according to some embodiments.

An embodiment of the present disclosure provides a method for controlling data duplication and transmission, applied to a secondary node. As shown in FIG. 3, the method includes:

In step 301, negotiating with a master node to determine whether to open or close a data duplication transmission function of at least one data radio bearer of target UE.

In step 302, determining, based on the negotiation result, that the master node controls the target UE to open or close a data duplication function of a first quantity of data radio bearers (DRB) of the at least one data radio bearer, and that the secondary node controls the target UE to open or close a data duplication function of a second quantity of data radio bearers of the at least one data radio bearer, where the first quantity of DRBs is at least partially different from the second quantity of DRBs; and In step 303, generating second control information based on the data duplication function of the second quantity of DRBs that is determined to be opened or closed, and sending the second control information to the target UE.

Here, the master node may be a node in a master cell group (MCG), and the secondary node may be a node in a secondary cell group (SCG).

In a network side, a master node of the MCG may negotiate with a secondary node of the SCG by using an Xn interface to determine a network node that controls opening or closing of data duplication functions of one or more DRBs of the UE.

Further, the generating second control information includes:

obtaining a correspondence between identification information of a DRB and a data bit in a bitmap; and generating, by setting a data bit corresponding to identification information of the second quantity of DRBs in the bitmap, the second control information.

For example, if the first control information with the bitmap format includes 8 bits, each bit may correspond to identification information of one DRB. Assuming that bits 1 to 3 may respectively correspond to DRBs 1, 4 and 7, and the remaining bits 4 to 8 are invalid bits, it may be determined that the first control information indicates opening or closing of which DRB by using the bitmap. Still further, a bit in a bitmap may be set as 0, which means to close a data duplication transmission function of a DRB. If a bit is 1, it means to open the data duplication transmission function of the DRB. Certainly, the setting may be further opposite and examples are not fully listed in this embodiment.

In addition, bits 1 to 3 in a bitmap of the second control information may respectively correspond to DRBs whose identifiers are 1, 3, and 7, and the remaining bits may be invalid bits. Meanings of the bits are the same as those in the foregoing setting manner, and details are not described herein again.

The DRB includes three types: an MCG bearer, an SCG bearer and a Split bearer. A media access control (MAC) control element (CE) sent by an master node (MN) is responsible for controlling opening or closing of data duplication functions of the MCG bearer and the Split bearer. A MAC CE sent by a secondary node (SN) is responsible for controlling opening or closing of data duplication functions of the SCG bearer and the Split bearer.

That the master node negotiates with the secondary node may include:

when a target DRB is a master cell bearer, determining that the master node controls the target DRB by using the first control information, where the target DRB may be understood as any one of a plurality of DRBs of the UE;

when a target DRB is a secondary cell bearer, determining that the secondary node controls the target DRB by using the second control information, where the target DRB may be understood as any one of a plurality of DRBs of the UE; and when a target DRB is used as a split bearer, determining, based on that a node corresponding to a group in which a PDCP of the DRB is located is a master node or a secondary node, that the master node or the secondary node generates control information to control opening or closing of a data duplication function of the target DRB. In other words, whether control information corresponding to a DRB is the first control information sent by the master node or the second control information sent by the secondary node is determined according to a group in which a PDCP of the DRB is located.

When a target DRB is used as the split bearer, it is determined, based on a default transmission path corresponding to the target DRB, that a master node or a secondary node outside the default transmission path generates control information to control opening or closing of a data duplication transmission function of the third DRB. In other words, whether control information corresponding to a DRB is the first control information sent by the master node or the second control information sent by the secondary node is determined according to a default transmission path corresponding to the DRB.

When a target DRB is used as the split bearer, it is determined, based on a PDCP version of the target DRB, that a master node or a secondary node corresponding to the PDCP version generates control information to control opening or closing of a data duplication transmission function of the third DRB by using the control information. In other words, whether control information corresponding to a DRB is the first control information sent by the master node or the second control information sent by the secondary node is determined according to a PDCP version of the DRB.

A solution provided in this embodiment is described below by using examples:

DRBs correspond to a bitmap of the MAC CE in ascending or descending order of IDs of the DRBs.

For example, DRBs whose IDs are 1, 3, 4, and 7 of the UE each have a PDCP data duplication transmission function, where the DRB whose ID is 1 is the MCG bearer, the DRB whose ID is 3 is the SCG bearer, and the DRBs whose IDs are 4 and 7 are split bearers.

Through cooperation, the MCG and the SCG in the network side may determine that the DRBs whose IDs are 1, 4, and 7 respectively correspond to bits 1, 2, and 3 in the bitmap of the MAC CE sent by the MN, where the remaining bits 4, 5, 6, 7, and 8 are invalid bits, and that the DRBs whose IDs are 3, 4, and 7 respectively correspond to bits 1, 2, and 3 in the bitmap of the MAC CE sent by the SN, where the remaining bits 4, 5, 6, 7, and 8 are invalid bits.

It can be seen that by using the foregoing solution, the UE side may determine, based on the first control information and/or the second control information sent from the master node and/or the secondary node, whether to open or close the data duplication transmission function of the at least one DRB of the UE side. In this way, in a dual-connectivity scenario, after it is determined that control information sent from the two nodes is received, the UE may determine the DRBs whose data duplication transmission functions are opened, thereby ensuring processing efficiency of the UE.

Embodiment 4

Figure 4:
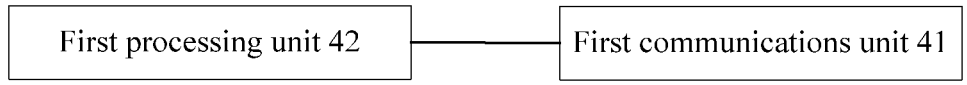
FIG. 4 is a schematic structural diagram of composition of UE according to some embodiments.

An embodiment of the present disclosure provides UE. As shown in FIG. 4, the UE includes:

a first communications unit 41, receiving first control information sent from a master node, and/or receiving second control information sent from a secondary node; and a first processing unit 42, determining, based on an indication of a first quantity of data radio bearers (DRB) corresponding to the first control information, and/or based on an indication of a second quantity of DRBs corresponding to the second control information, to open or close a data duplication transmission function of at least one DRB.

Here, the master node may be a node in a master cell group (MCG), and the secondary node may be a node in a secondary cell group (SCG).

The first communications unit 41 receives the first control information with a bitmap format sent from the master node, and/or receives the second control information with the bitmap format sent from the secondary node.

Control information of the master node and control information of the secondary node may be simultaneously received or may be respectively received. The order of receiving the first control information and the second control information is not limited herein.

At a network side, a master node of the MCG cooperates with a secondary node of the SCG by using an Xn interface to determine a network node that controls opening or closing of a data duplication function of a DRB of the UE.

Further, the first quantity of DRBs indicated by the first control information is determined based on a correspondence between the first control information with a bitmap format and identification information of a DRB; and/or the second quantity of DRBs indicated by the second control information is determined based on a correspondence between the second control information with a bitmap format and identification information of a DRB.

For example, if the first control information with the bitmap format includes 8 bits, each bit may correspond to identification information of one DRB. Assuming that bits 1 to 3 may respectively correspond to DRBs 1, 4 and 7, and the remaining bits 4 to 8 are invalid bits, it may be determined that the first control information indicates opening or closing of which DRB by using the bitmap. Still further, a bit in a bitmap may be set as 0, which means to close a data duplication transmission function of a DRB. If a bit is 1, it means to open the data duplication transmission function of the DRB. Certainly, the setting may be further opposite and examples are not fully listed in this embodiment.

In addition, bits 1 to 3 in a bitmap of the second control information may respectively correspond to DRBs whose identifiers are 1, 3, and 7, and the remaining bits may be invalid bits. Meanings of the bits are the same as those in the foregoing setting manner, and details are not described herein again.

The DRB includes three types: an MCG bearer, an SCG bearer and a Split bearer. A media access control (MAC) control element (CE) sent by an master node (ME) is responsible for controlling opening or closing of data duplication functions of the MCG bearer and the Split bearer. A MAC CE sent by an SN is responsible for controlling opening or closing of data duplication functions of the SCG bearer and the Split bearer.

When the determining, based on an indication of a first quantity of data radio bearers (DRB) corresponding to the first control information, and/or based on an indication of a second quantity of DRBs corresponding to the second control information, to open or close a data duplication transmission function of at least one DRB, is operated, three factors may be considered for how to control:

First Factor:

When the first quantity of DRBs corresponding to the first control information includes a first DRB used as a master cell bearer, the first processing unit 42 determines to open or close a data duplication transmission function of the first DRB based on an indication of the first control information; and/or when the second quantity of DRBs corresponding to the second control information includes a second DRB used as a secondary cell bearer, the first processing unit 42 determines to open or close a data duplication transmission function of the second DRB based on an indication of the second control information. It should be noted that, the first DRB is not included in the second quantity of DRBs, and the second DRB is not included in the first quantity of DRBs.

In other words, non-split bearers, that is, non-split bearers (e.g., may be the MCG bearer (the first DRB) and the SCG bearer (the second DRB)), are not controlled by opposite ends. For example, a MAC CE of the MCG controls the MCG bearer, and a MAC CE of the SCG controls the SCG bearer.

It should be understood that, quantities of first DRBs and second DRBs are not limited in this embodiment. There may be one or more first DRBs and second DRBs in reality, and the quantities of the first DRBs and the second DRBs may be different.

Second Factor:

When the first quantity of DRBs corresponding to the first control information includes a third DRB used as a split bearer, and/or when the second quantity of DRBs corresponding to the second control information includes a third DRB used as a split bearer, the first processing unit 42 determines to open or close a data duplication transmission function of the third DRB based on a preset condition.

The split bearer, that is, the third DRB, may be the Split bearer, and the third DRB may be controlled by the MCG or the SCG.

Specifically, the preset condition may include at least one of the following:

Condition 1: Determining, based on a group in which a PDCP (packet data convergence protocol) of the third DRB is located, control information sent from a node corresponding to the group to control opening or closing of a data duplication transmission function of the third DRB.

A group in which a PDCP of the third DRB is located may be determined according to a key value of the third DRB. In other words, the first processing unit 42 obtains the key value corresponding to the third DRB, and determines, based on the key value corresponding to the third DRB, the group in which the PDCP of the third DRB is located.

For example, if a PDCP of a split bearer is in the MCG, the MAC CE of the MCG controls the split bearer. UE may distinguish whether the PDCP of the split bearer is in the MCG or the SCG by using different key values of split bearers. Different groups may correspond to different key values, and a setting manner of the key values may be determined in advance through a negotiation between the network side and UE side. In dual connectivity (DC), a key value of a split bearer may be KeNB or S-KgNB, and the UE can distinguish whether a PDCP is in the MCG or the SCG by identifying the two key values. Specifically, KeNB may be a key corresponding to the MCG, and S-KgNB may be a key corresponding to the SCG.

Condition 2: Determining, based on a default transmission path corresponding to the third DRB, control information sent from a control node outside the default transmission path to control opening or closing of the data duplication transmission function of the third DRB.

The default transmission path is a path used when the data duplication transmission function is in a deactivated state.

For example, a non-default leg and a default leg of a split bearer (that is, the third DRB) refer to default transmission paths used after duplication is deactivated. A node corresponding to the non-default leg may be used to control the duplication.

Condition 3: Determining, based on a PDCP version of the third DRB, control information sent from a node corresponding to the PDCP version to control opening or closing of the data duplication transmission function of the third DRB.

The PDCP version of the third DRB is one of the following: a long term evolution (LTE) PDCP version, and an new radio (NR) PDCP version.

A split bearer is controlled in dependence on a PDCP version of the split bearer. For example, a MAC CE of an LTE side can only control a split bearer whose PDCP is an LTE PDCP, and a MAC CE of an NR side can only control a split bearer whose PDCP is an NR PDCP.

It should be understood that, the first factor, the second factor and the three conditions in the second factor may be combined to perform determination. Combinations are not fully listed in this embodiment, and all types of combinations fall within the protection scope of this embodiment.

Figure 5:
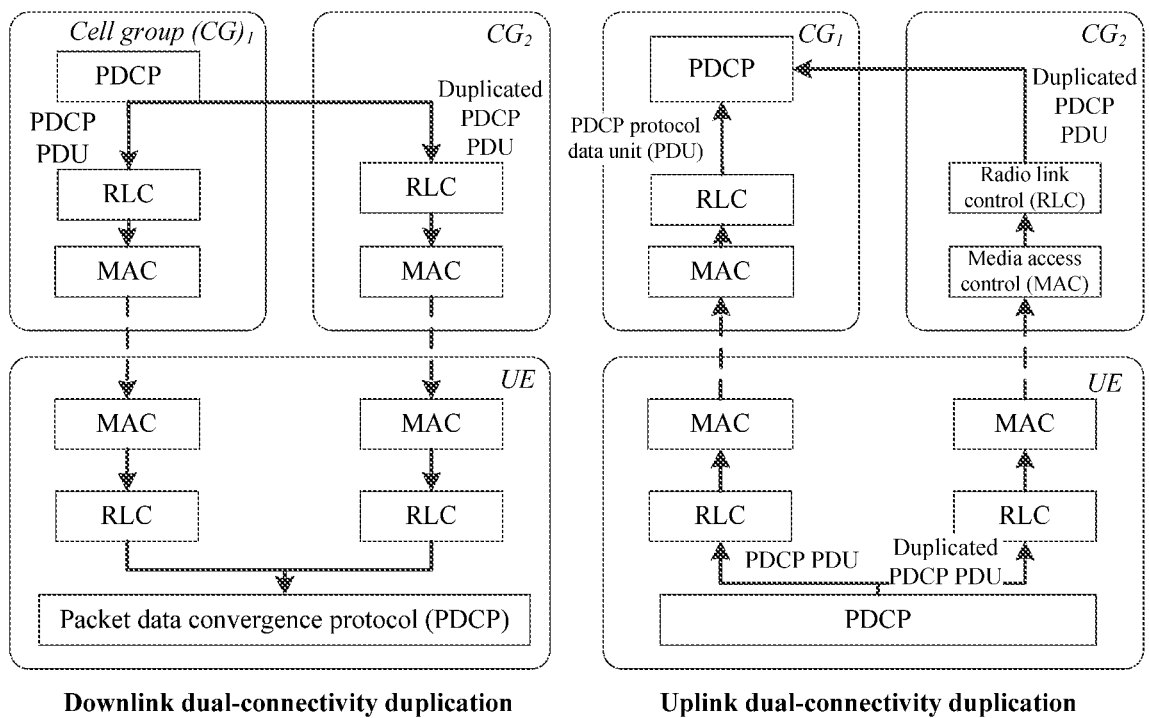
FIG. 5 is a schematic diagram of a protocol layer architecture according to some embodiments.

Referring to FIG. 5, it can be seen that, a protocol architecture of a split bearer is adopted for data duplication and transmission. For an uplink and a downlink, a PDCP is located in a cell group (CG) (MCG or SCG), where the CG is an anchor CG. The PDCP duplicates a PDCP packet data unit (PDU) into two same copies. For example, one copy is a PDCP PDU, and the other copy is a duplicated PDCP PDU. Two PDCPs pass through an radio link control (RLC) and a media access control (MAC) of different CGs, pass through an air interface to MAC and RLC layers corresponding to UE (downlink) or a base station (uplink), and finally gather into a PDCP. The PDCP layer detects that the two PDCPs are the same duplication version, and then discards one of the two PDCPs and submits the other to an upper layer. A bearer that respectively connects the two RLCs and MACs under the PDCP is referred to as a split bearer. If a PDCP is located in the MCG, the bearer is a split bearer of the MCG. If a PDCP is located in the SCG, the bearer is a split bearer of the SCG. Specifically, a solution provided in this embodiment is described below.

DRBs correspond to a bitmap of the MAC CE in ascending or descending order of IDs of the DRBs. For example, DRBs whose IDs are 1, 3, 4, and 7 of the UE each have a PDCP data duplication transmission function, where the DRB whose ID is 1 is the MCG bearer, the DRB whose ID is 3 is the SCG bearer, and the DRBs whose IDs are 4 and 7 are split bearers.

Through cooperation, the MCG and the SCG in the network side may determine that the DRBs whose IDs are 1, 4, and 7 respectively correspond to bits 1, 2, and 3 in the bitmap of the MAC CE sent by the MN, where the remaining bits 4, 5, 6, 7, and 8 are invalid bits, and that the DRBs whose IDs are 3, 4, and 7 respectively correspond to bits 1, 2, and 3 in the bitmap of the MAC CE sent by the SN, where the remaining bits 4, 5, 6, 7, and 8 are invalid bits.

Correspondingly, a MAC layer of the UE receives the first control information and/or the second control information sent by a network (which may be the master node in the MCG or the secondary node in the SCG) to open or close the data duplication transmission function of the at least one DRB.

The MAC layer of the UE indicates, to PDCP layers of corresponding DRBs, corresponding bits in the bitmap of the MAC CE controlled by the received duplicated data.

The MAC layer of the UE finds out, based on a correspondence between the bitmap and IDs of DRBs, the bits in the bitmap corresponding to the IDs of the DRBs. For example, DRBs whose IDs are 1, 4, and 7 of the UE respectively correspond to bits 1, 2, and 3 in the bitmap of the MAC CE of the MN. After receiving the bitmap of the MAC CE, the MAC CE indicates a value of the first bit to a PDCP of the DRB whose ID is 1, a value of the second bit to a PDCP of the DRB whose ID is 3, and so on.

The foregoing processing manner in this embodiment is specific to how to determine, according to a relationship between a DRB and control information after control information is received, control information to which a DRB corresponds, for example, how to decide, when a DRB receives the first control information and the second control information, on control information which is to be used to perform subsequent processing.

In addition, this embodiment may further provide another processing manner, that is, which DRB obtains which control information is determined in advance according to a preset rule. In this processing manner, the network side may only send one piece of control information for one DRB. The specific processing manner is as follows:

Which control information corresponds to each of the at least one DRB of the UE is described, which may be determining, according to a preset rule, that each of the at least one DRB corresponds to first control information or second control information. It should be understood that, the foregoing preset rule may be a preset rule which the UE side and node (the master node and the secondary node) side both possess, that is, the UE side determines, based on the preset rule, which DRB corresponds to a bit in which control information. Correspondingly, the node may also determine, based on the preset rule, control information of which DRB is placed in which bit.

Specifically, it may be understood that different pieces of identification information of DRBs correspond to which bit in the first control information or the second control information.

The preset rule includes at least one of the following:
when a DRB is a master cell bearer, the DRB is included in a first quantity of DRBs corresponding to the first control information; and
when a DRB is a secondary cell bearer, the DRB is included in a second quantity of DRBs corresponding to the second control information.

In other words, when a DRB is the master cell bearer, identification information of the DRB corresponds to a first bit in the first control information; and when a DRB is the secondary cell bearer, identification information of the DRB corresponds to a second bit in the second control information. The first bit and the second bit do not actually represent specific bits in the control information. However, it merely means that the first bit is different from the second bit. Actually, the first bit may be bit 3 in the first control information, and the second bit may be bit 1 in the second control information.

Moreover, when the DRB is the master cell bearer, the DRB does not correspond to the second control information and is not included in the second quantity of DRBs; and when the DRB is the secondary cell bearer, the DRB does not correspond to the first control information and is not included in the first quantity of DRBs.

When the DRB is the master cell bearer, the DRB is not included in the second quantity of DRBs; and when the DRB is the secondary cell bearer, the DRB is not included in the first quantity of DRBs.

The preset rule further includes at least one of the following:
when a PDCP version of a DRB is a first version, the DRB is included in the first quantity of DRBs corresponding to the first control information; and
when a PDCP version of a DRB is a second version, the DRB is included in the second quantity of DRBs corresponding to the second control information.

The first version is different from the second version, and the first version and the second version are each one of an LTE PDCP version and an NR PDCP version. In other words, when the first version is an LTE PDCP, the second version is an NR PDCP; or when the first version is the NR PDCP, the second version is the LTE PDCP.

It should be further noted that, when a PDCP version of a DRB is the second version, the DRB is not included in the first quantity of DRBs; and when a PDCP version of a DRB is the first version, the DRB is not included in the second quantity of DRBs.

The preset rule further includes at least one of the following:
when a PDCP of a DRB uses a master cell group key, the DRB is included in the first quantity of DRBs corresponding to the first control information; and
when a PDCP of a DRB uses a secondary cell group key, the DRB is included in the second quantity of DRBs corresponding to the second control information.

When a PDCP of a DRB uses the master cell group key, the DRB is not included in the second quantity of DRBs corresponding to the second control information; and when a PDCP of a DRB uses the secondary cell group key, the DRB is not included in the first quantity of DRBs corresponding to the first control information.

The preset rule further includes at least one of the following:
when a DRB is a split bearer, determining, based on a group in which a PDCP of the DRB is located, control information sent from a node corresponding to the group in which the PDCP is located to control the DRB, where it should be understood that the node may be a master node or a secondary node, and the control information may be one of the first control information and the second control information;

when a DRB is the split bearer, determining, based on a default transmission path corresponding to the DRB, control information sent from a node outside the default transmission path to control the DRB, where it should be understood that the node may be a master node or a secondary node, and the control information may be one of the first control information and the second control information;

when a DRB is the split bearer, determining, based on a default transmission path corresponding to the DRB, control information sent from a node of the default transmission path to control the DRB, where it should be understood that the node may be a master node or a secondary node, and the control information may be one of the first control information and the second control information;

when a DRB is the split bearer, determining, based on a PDCP version of the DRB, control information sent from a node corresponding to the PDCP version to control the DRB, where it should be understood that the node may be a master node or a secondary node, and the control information may be one of the first control information and the second control information; and when a DRB is the split bearer, determining, based on an air interface type of a node, control information sent from a node with a specific air interface type to control the DRB, where the air interface type of the node may be an LTE node or an NR node. Correspondingly, it may be understood that an LTE node is preset as the node with the specific air interface type, or an NR node is preset as the node with the specific air interface type. Through this rule, if two nodes both send control information, the UE may know a node whose control information is used to perform subsequent processing.

When a DRB is the split bearer, it is determined, based on a group in which a PDCP of the DRB is located, that control information sent from a node corresponding to a group in which the DRB is not located cannot control the DRB.

When a DRB is the split bearer, it is determined, based on a default transmission path corresponding to the DRB, that control information sent from a node of the default transmission path cannot control the DRB.

When a DRB is the split bearer, it is determined, based on a PDCP version of the DRB, that control information sent from a node that does not correspond to the PDCP version cannot control the DRB.

It can be seen that by using the foregoing solution, the UE side may determine, based on the first control information and/or the second control information sent from the master node and/or the secondary node, whether to open or close the data duplication transmission function of the at least one DRB of the UE side. In this way, in a dual-connectivity scenario, after it is determined that control information sent from the two nodes is received, the UE may determine the DRBs whose data duplication transmission functions are opened, thereby ensuring processing efficiency of the UE.

Embodiment 5

Figure 6:
FIG. 6 is a schematic structural diagram of composition of a master node according to some embodiments.

As shown in FIG. 6, an embodiment of the present disclosure provides a master node, including:

a second communications unit 61, negotiating with a secondary node to determine to open or close a data duplication transmission function of at least one data radio bearer of target UE, and sending the first control information to the target UE; and a second processing unit 62, determining, based on the negotiation result, that the master node controls the target UE to open or close a data duplication function of a first quantity of data radio bearers of the at least one data radio bearer, and that the secondary node controls the target UE to open or close a data duplication function of a second quantity of data radio bearers of the at least one data radio bearer, where the first quantity of data radio bearers is at least partially different from the second quantity of data radio bearers, and generating the first control information based on the data duplication function of the first quantity of data radio bearers (DRB) that is determined to be opened or closed.

Here, the master node may be a node in a master cell group (MCG), and the secondary node may be a node in a secondary cell group (SCG).

In a network side, a master node of the MCG may negotiate with a secondary node of the SCG by using an Xn interface to determine a network node that controls opening or closing of data duplication functions of one or more DRBs of the UE.

Further, the second processing unit 62 obtains a correspondence between identification information of a DRB and a data bit in a bitmap; and generates, by setting a data bit corresponding to identification information of the first quantity of DRBs in the bitmap, the first control information.

The first quantity of DRBs indicated by the first control information is determined based on a correspondence between the first control information with a bitmap format and identification information of a DRB; and/or the second quantity of DRBs indicated by the second control information is determined based on a correspondence between the second control information with a bitmap format and identification information of a DRB.

For example, if the first control information with the bitmap format includes 8 bits, each bit may correspond to identification information of one DRB. Assuming that bits 1 to 3 may respectively correspond to DRBs 1, 4 and 7, and the remaining bits 4 to 8 are invalid bits, it may be determined that the first control information indicates opening or closing of which DRB by using the bitmap. Still further, a bit in a bitmap may be set as 0, which means to close a data duplication transmission function of a DRB. If a bit is 1, it means to open the data duplication transmission function of the DRB. Certainly, the setting may be further opposite and examples are not fully listed in this embodiment.

In addition, bits 1 to 3 in a bitmap of the second control information may respectively correspond to DRBs whose identifiers are 1, 3, and 7, and the remaining bits may be invalid bits. Meanings of the bits are the same as those in the foregoing setting manner, and details are not described herein again.

The DRB includes three types: an MCG bearer, an SCG bearer and a Split bearer. A media access control (MAC) control element (CE) sent by a master node (MN) is responsible for controlling opening or closing of data duplication functions of the MCG bearer and the Split bearer. A MAC CE sent by a secondary node (SN) is responsible for controlling opening or closing of data duplication functions of the SCG bearer and the Split bearer.

That the master node negotiates with the secondary node may include:

when a target DRB is a master cell bearer, the second processing unit 62 determines that the master node controls the target DRB by using the first control information, where the target DRB may be understood as any one of a plurality of DRBs of the UE;

when a target DRB is a secondary cell bearer, the second processing unit 62 determines that the secondary node controls the target DRB by using the second control information, where the target DRB may be understood as any one of a plurality of DRBs of the UE; and when a target DRB is used as a split bearer, the second processing unit 62 determines, based on that a node corresponding to a group in which a PDCP of the DRB is located is a master node or a secondary node, that the master node or the secondary node generates control information to control opening or closing of a data duplication function of the target DRB. In other words, whether control information corresponding to a DRB is the first control information sent by the master node or the second control information sent by the secondary node is determined according to a group in which a PDCP of the DRB is located.

When a target DRB is used as the split bearer, the second processing unit 62 determines, based on a default transmission path corresponding to the target DRB, a master node or a secondary node outside the default transmission path generates control information to control opening or closing of a data duplication transmission function of the third DRB. In other words, whether control information corresponding to a DRB is the first control information sent by the master node or the second control information sent by the secondary node is determined according to a default transmission path corresponding to the DRB.

When a target DRB is used as the split bearer, the second processing unit 62 determines, based on a PDCP version of the target DRB, a master node or a secondary node corresponding to the PDCP version generates control information to control opening or closing of a data duplication transmission function of the third DRB by using the control information. In other words, whether control information corresponding to a DRB is the first control information sent by the master node or the second control information sent by the secondary node is determined according to a PDCP version of the DRB.

A solution provided in this embodiment is described below by using examples:

DRBs correspond to a bitmap of the MAC CE in ascending or descending order of IDs of the DRBs.

For example, DRBs whose IDs are 1, 3, 4, and 7 of the UE each have a PDCP data duplication transmission function, where the DRB whose ID is 1 is the MCG bearer, the DRB whose ID is 3 is the SCG bearer, and the DRBs whose IDs are 4 and 7 are split bearers.

Through cooperation, the MCG and the SCG in the network side may determine that the DRBs whose IDs are 1, 4, and 7 respectively correspond to bits 1, 2, and 3 in the bitmap of the MAC CE sent by the MN, where the remaining bits 4, 5, 6, 7, and 8 are invalid bits, and that the DRBs whose IDs are 3, 4, and 7 respectively correspond to bits 1, 2, and 3 in the bitmap of the MAC CE sent by the SN, where the remaining bits 4, 5, 6, 7, and 8 are invalid bits.

It can be seen that by using the foregoing solution, the UE side may determine, based on the first control information and/or the second control information sent from the master node and/or the secondary node, whether to open or close the data duplication transmission function of the at least one DRB of the UE side. In this way, in a dual-connectivity scenario, after it is determined that control information sent from the two nodes is received, the UE may determine the DRBs whose data duplication transmission functions are opened, thereby ensuring processing efficiency of the UE.

Embodiment 6

Figure 7:
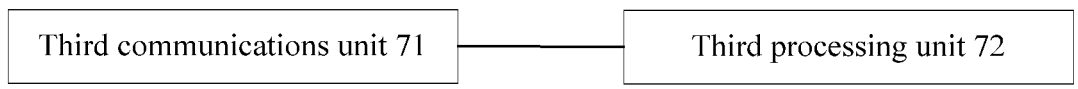
FIG. 7 is a schematic structural diagram of composition of a secondary node according to some embodiments.

As shown in FIG. 7, an embodiment of the present disclosure provides a secondary node, including:

a third communications unit 71, negotiating with a master node to determine to open or close a data duplication transmission function of at least one data radio bearer of target UE, and sending second control information to the target UE; and a third processing unit 72, determining, based on the negotiation result, that the master node controls the target UE to open or close a data duplication function of a first quantity of data radio bearers (DRB) of the at least one data radio bearer, and that the secondary node controls the target UE to open or close a data duplication function of a second quantity of data radio bearers of the at least one DRB, where the first quantity of DRBs is at least partially different from the second quantity of DRBs, and generating the second control information based on the data duplication function of the second quantity of DRBs that is determined to be opened or closed.

Here, the master node may be a node in a master cell group (MCG), and the secondary node may be a node in a secondary cell group (SCG).

In a network side, a master node of the MCG may negotiate with a secondary node of the SCG by using an Xn interface to determine a network node that controls opening or closing of data duplication functions of one or more DRBs of the UE.

Further, the third processing unit 72 obtains a correspondence between identification information of a DRB and a data bit in a bitmap; and generates, by setting a data bit corresponding to identification information of the second quantity of DRBs in the bitmap, the second control information.

For example, if the first control information with the bitmap format includes 8 bits, each bit may correspond to identification information of one DRB. Assuming that bits 1 to 3 may respectively correspond to DRBs 1, 4 and 7, and the remaining bits 4 to 8 are invalid bits, it may be determined that the first control information indicates opening or closing of which DRB by using the bitmap. Still further, a bit in a bitmap may be set as 0, which means to close a data duplication transmission function of a DRB. If a bit is 1, it means to open the data duplication transmission function of the DRB. Certainly, the setting may be further opposite and examples are not fully listed in this embodiment.

In addition, bits 1 to 3 in a bitmap of the second control information may respectively correspond to DRBs whose identifiers are 1, 3, and 7, and the remaining bits may be invalid bits. Meanings of the bits are the same as those in the foregoing setting manner, and details are not described herein again.

The DRB includes three types: an MCG bearer, an SCG bearer and a Split bearer. A media access control (MAC) control element (CE) sent by a master node (MN) is responsible for controlling opening or closing of data duplication functions of the MCG bearer and the Split bearer. A MAC CE sent by a secondary node (SN) is responsible for controlling opening or closing of data duplication functions of the SCG bearer and the Split bearer.

That the master node negotiates with the secondary node may include:

when a target DRB is a master cell bearer, the third processing unit 72 determines that the master node controls the target DRB by using the first control information, where the target DRB may be understood as any one of a plurality of DRBs of the UE;

when a target DRB is a secondary cell bearer, the third processing unit 72 determines that the secondary node controls the target DRB by using the second control information, where the target DRB may be understood as any one of a plurality of DRBs of the UE; and when a target DRB is used as a split bearer, the third processing unit 72 determines, based on that a node corresponding to a group in which a PDCP of the DRB is located is a master node or a secondary node, that the master node or the secondary node generates control information to control opening or closing of a data duplication function of the target DRB. In other words, whether control information corresponding to a DRB is the first control information sent by the master node or the second control information sent by the secondary node is determined according to a group in which a PDCP of the DRB is located.

When a target DRB is used as the split bearer, the third processing unit 72 determines, based on a default transmission path corresponding to the target DRB, a master node or a secondary node outside the default transmission path generates control information to control opening or closing of a data duplication transmission function of the third DRB. In other words, whether control information corresponding to a DRB is the first control information sent by the master node or the second control information sent by the secondary node is determined according to a default transmission path corresponding to the DRB.

When a target DRB is used as the split bearer, the third processing unit 72 determines, based on a PDCP version of the target DRB, a master node or a secondary node corresponding to the PDCP version generates control information to control opening or closing of a data duplication transmission function of the third DRB by using the control information. In other words, whether control information corresponding to a DRB is the first control information sent by the master node or the second control information sent by the secondary node is determined according to a PDCP version of the DRB.

A solution provided in this embodiment is described below by using examples:

DRBs correspond to a bitmap of the MAC CE in ascending or descending order of IDs of the DRBs.

For example, DRBs whose IDs are 1, 3, 4, and 7 of the UE each have a PDCP data duplication transmission function, where the DRB whose ID is 1 is the MCG bearer, the DRB whose ID is 3 is the SCG bearer, and the DRBs whose IDs are 4 and 7 are split bearers.

Through cooperation, the MCG and the SCG in the network side may determine that the DRBs whose IDs are 1, 4, and 7 respectively correspond to bits 1, 2, and 3 in the bitmap of the MAC CE sent by the MN, where the remaining bits 4, 5, 6, 7, and 8 are invalid bits, and that the DRBs whose IDs are 3, 4, and 7 respectively correspond to bits 1, 2, and 3 in the bitmap of the MAC CE sent by the SN, where the remaining bits 4, 5, 6, 7, and 8 are invalid bits.

It can be seen that by using the foregoing solution, the UE side may determine, based on the first control information and/or the second control information sent from the master node and/or the secondary node, whether to open or close the data duplication transmission function of the at least one DRB of the UE side. In this way, in a dual-connectivity scenario, after it is determined that control information sent from the two nodes is received, the UE may determine the DRBs whose data duplication transmission functions are opened, thereby ensuring processing efficiency of the UE.

Embodiment 7

Figure 8:
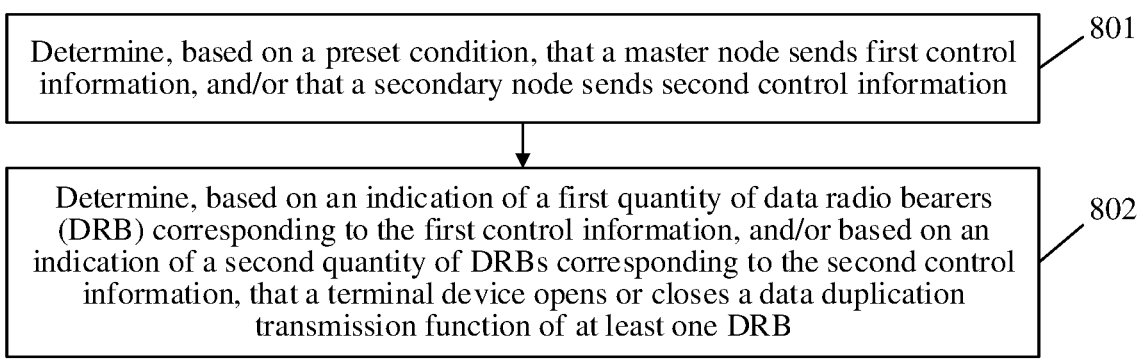
FIG. 8 is a schematic flowchart 4 of a method for controlling data duplication and transmission according to some embodiments.

An embodiment of the present disclosure provides a method for controlling data duplication and transmission, applied to a network node. As shown in FIG. 8, the method includes:

In step 801, determining, based on a preset condition, that a master node sends first control information, and/or that a secondary node sends second control information; and In step 802, determining, based on an indication of a first quantity of data radio bearers (DRB) corresponding to the first control information, and/or based on an indication of a second quantity of DRBs corresponding to the second control information, that a terminal device opens or closes a data duplication transmission function of at least one DRB.

The network node in this embodiment may be understood as a control node, which may control the master node, the secondary node and the terminal device. The master node may be a node in a master cell group (MCG), and the secondary node may be a node in a secondary cell group (SCG). A network side controls opening or closing of a data duplication function of one or more DRBs of UE by using the network node provided in this embodiment.

The method further includes: when the at least one DRB includes a DRB whose PDCP version is a first version, determining that the secondary node does not send the second control information; and when the at least one DRB includes a DRB whose PDCP version is a first version, if the at least one DRB includes a split bearer, determining that the secondary node does not send the second control information.

The method further includes:

when the at least one DRB includes a DRB whose PDCP version is a second version, determining that the master node does not send the first control information.

When the at least one DRB includes a DRB whose PDCP version is a second version, the at least one DRB includes a split bearer, or the at least one DRB includes a master cell group bearer whose PDCP version is the second version.

Further, the determining that a terminal device opens or closes a data duplication transmission function of at least one DRB may be in a manner of: obtaining a correspondence between identification information of a DRB and a data bit in a bitmap; and determining, by setting a data bit corresponding to the identification information of the DRB in the bitmap, that the terminal device opens or closes the data duplication transmission function of the at least one DRB.

For example, bits 1 to 3 may respectively correspond to DRBs 1, 4, and 7, and the remaining bits 4 to 8 are invalid bits. It may be determined that opening or closing of which DRB is indicated by using the bitmap. Still further, a bit in the bitmap may be set as 0, which means to close a data duplication transmission function of a DRB. If a bit is 1, it means to open the data duplication transmission function of the DRB. Certainly, the setting may be further opposite and examples are not fully listed in this embodiment.

The DRB includes three types: an MCG bearer, an SCG bearer and a Split bearer. A media access control (MAC) control element (CE) sent by a master node (MN) is responsible for controlling opening or closing of data duplication functions of the MCG bearer and the Split bearer. A MAC CE sent by a secondary node (SN) is responsible for controlling opening or closing of data duplication functions of the SCG bearer and the Split bearer.

It can be seen that by using the foregoing solution, the UE side may determine, based on control information sent from the network node, whether to open or close the data duplication transmission function of the at least one DRB of the UE side. In this way, in a dual-connectivity scenario, after it is determined that control information sent from the two nodes is received, the UE may determine the DRBs whose data duplication transmission functions are opened, thereby ensuring processing efficiency of the UE.

Embodiment 8

Figure 9:
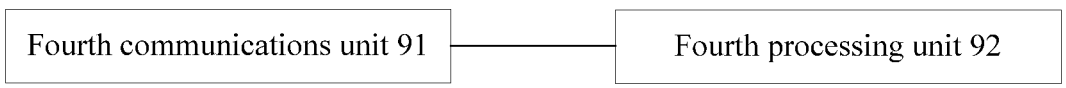
FIG. 9 is a schematic structural diagram of composition of a network node according to some embodiments.

As shown in FIG. 9, an embodiment of the present disclosure provides a network node, including:

a fourth communications unit 91, determining, based on a preset condition, that a master node sends first control information, and/or that a secondary node sends second control information; and a fourth processing unit 92, determining, based on an indication of a first quantity of data radio bearers (DRB) corresponding to the first control information, and/or based on an indication of a second quantity of DRBs corresponding to the second control information, that a terminal device opens or closes a data duplication transmission function of at least one DRB.

When the at least one DRB includes a DRB whose PDCP version is a first version, the fourth processing unit 92 determines that the secondary node does not send the second control information.

When the at least one DRB includes a DRB whose PDCP version is the first version, if the at least one DRB includes a split bearer, the fourth processing unit 92 determines that the secondary node does not send the second control information.

When the at least one DRB includes a DRB whose PDCP version is a second version, the fourth processing unit 92 determines that the master node does not send the first control information.

When the at least one DRB includes a DRB whose PDCP version is the second version, the at least one DRB includes a split bearer, or the at least one DRB includes a master cell group bearer whose PDCP version is the second version.

Further, the determining that a terminal device opens or closes a data duplication transmission function of at least one DRB may be in a manner of: obtaining a correspondence between identification information of a DRB and a data bit in a bitmap; and determining, by setting a data bit corresponding to the identification information of the DRB in the bitmap, that the terminal device opens or closes the data duplication transmission function of the at least one DRB.

For example, bits 1 to 3 may respectively correspond to DRBs 1, 4, and 7, and the remaining bits 4 to 8 are invalid bits. It may be determined that opening or closing of which DRB is indicated by using the bitmap. Still further, a bit in a bitmap may be set as 0, which means to close a data duplication transmission function of a DRB. If a bit is 1, it means to open the data duplication transmission function of the DRB. Certainly, the setting may be further opposite and examples are not fully listed in this embodiment.

The DRB includes three types: an MCG bearer, an SCG bearer and a Split bearer. A media access control (MAC) control element (CE) sent by a master node (MN) is responsible for controlling opening or closing of data duplication functions of the MCG bearer and the Split bearer. A MAC CE sent by a secondary node (SN) is responsible for controlling opening or closing of data duplication functions of the SCG bearer and the Split bearer.

It can be seen that by using the foregoing solution, the UE side may determine, based on control information sent from the network node, whether to open or close the data duplication transmission function of the at least one DRB of the UE side. In this way, in a dual-connectivity scenario, after it is determined that control information sent from the two nodes is received, the UE may determine the DRBs whose data duplication transmission functions are opened, thereby ensuring processing efficiency of the UE.

Figure 10:
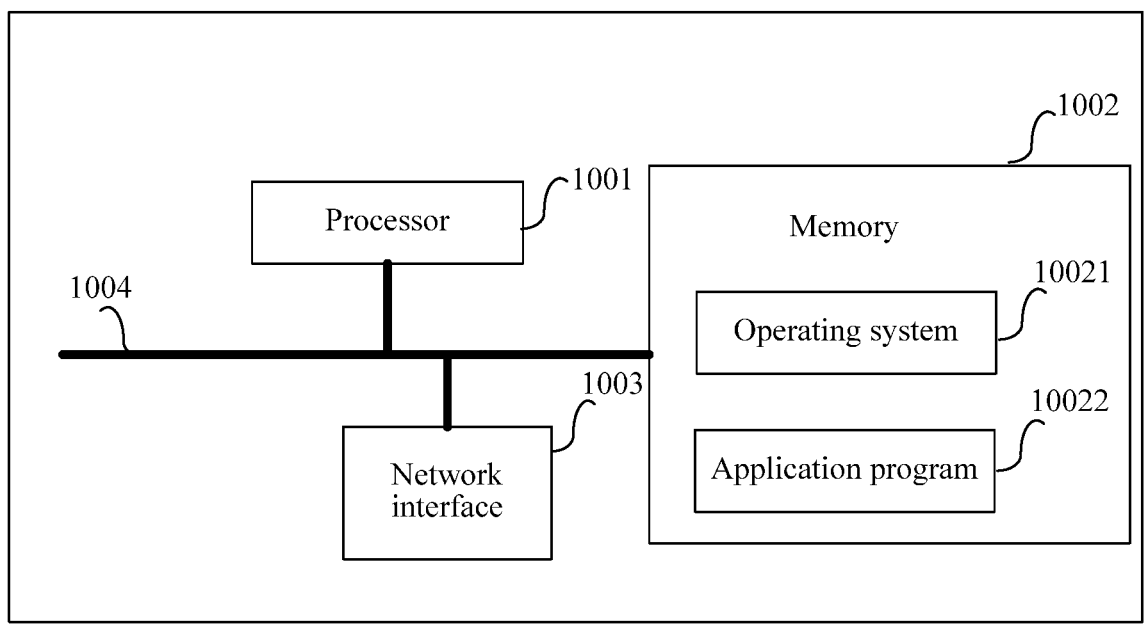
FIG. 10 is a schematic diagram of a hardware architecture according to some embodiments.

An embodiment of the present disclosure further provides UE or a hardware composition architecture of a node. As shown in FIG. 10, the UE includes: at least one processor 1001, a memory 1002, and at least one network interface 1003. All the components are coupled together by using a bus system 1004. It may be understood that, the bus system 1004 is configured to implement connection and communication between the components. The bus system 1004 further includes a power bus, a control bus, and a status signal bus in addition to a data bus. However, for clear description, various types of buses in FIG. 10 are all marked as the bus system 1004.

It may be understood that the memory 1002 in the embodiments of the present disclosure may be a volatile memory or a nonvolatile memory, or may include both a volatile memory and a nonvolatile memory.

In some embodiments, the memory 1002 stores the following elements, executable modules or data structures, or a subset thereof, or an extended set thereof:

an operating system 10021 and an application program 10022.

The processor 1001 is configured to be capable of processing steps of the method according to any one of the foregoing embodiment 1 to embodiment 3. Details are not described herein again.

An embodiment of the present disclosure provides a computer readable medium, where the computer readable medium stores a computer executable instruction, and the computer executable instruction, when executed, implements steps of the method according to any one of the foregoing embodiment 1 through embodiment 3.

When the foregoing devices in the embodiments of the present disclosure are implemented in a form of a software functional module and sold or used as an independent product, the devices may alternatively be stored in a computer-readable storage medium. Based on such an understanding, the technical solutions of the embodiments of the present disclosure essentially, or the part contributing to the prior art may be implemented in a form of a software product. The computer software product is stored in a storage medium and includes several instructions for instructing a computer device (which may be a personal computer, a server, a master node, a secondary node, or the like) to perform all or some of the methods described in the embodiments of the present disclosure. The foregoing storage medium includes: any medium that can store program code, such as a USB flash drive, a removable hard disk, a read-only memory (ROM), a magnetic disk, or a compact disc. In this way, the embodiments of the present disclosure are not limited to any specific combination of hardware and software.

Correspondingly, an embodiment of the present disclosure further provides a computer readable medium storing a computer program, and the computer program is used for performing the method for controlling data duplication and transmission in the embodiments of the present disclosure.

Although preferred embodiments of the present disclosure have been disclosed for the purpose of an example, a person skilled in the art may be aware that any improvement, addition and replacement may also be possible. Therefore, the scope of the present disclosure should not be limited to the above embodiments.

What is claimed is:

1. A method performed by a user equipment (UE) for controlling data duplication and transmission, the method comprising:
   receiving, by the UE, control information including first control information from a master node and/or second control information from a secondary node, the first control information including an indication of a first quantity of data radio bearers (DRBs), the second control information including an indication of a second quantity of DRBs;
   determining, by the UE based on the first control information and/or the second control information, to open or close one or more data duplication and transmission functions of the DRBs, wherein the DRBs comprise at least one of a master cell bearer, a secondary cell bearer and a split bearer;
   wherein determining to open or close the one or more data duplication and transmission functions further comprises:
   when the first quantity of DRBs corresponding to the first control information includes a first DRB used as a master cell bearer, determining to open or close a data duplication transmission function of the first DRB based on an indication of the first control information wherein the first DRB is not included in the second quantity of DRBs; and
   when the second quantity of DRBs corresponding to the second control information includes a second DRB used as a secondary cell bearer, determining to open or close a data duplication transmission function of the second DRB based on an indication of the second control information, wherein the second DRB is not included in the first quantity of DRBs.

2. The method of claim 1, wherein the first control information is from a master node.

3. The method of claim 1, wherein the second control information is from a secondary node.

4. The method of claim 1, wherein determining to open or close the one or more data duplication transmission functions further comprises:
   when the DRBs indicated by the first control information from a master node or the second control information from a secondary node includes a third DRB as a split bearer, determining to open or close a data duplication and transmission function of the third DRB based on a preset condition.

5. The method of claim 4, wherein the preset condition comprises one or more of the following:
   a determination, based on a cell group in which a packet data convergence protocol (PDCP) of the third DRB is located, that control information from a node of the group to control opening or closing of the data duplication transmission function of the third DRB;
   a determination, based on a default transmission path of the third DRB, that control information including a control node outside the default transmission path to control opening or closing of the data duplication transmission function of the third DRB; or
   a determination, based on a PDCP version of the third DRB, that control information from a node corresponding to the PDCP version to control opening or closing of the data duplication transmission function of the third DRB.

6. The method of claim 5 further comprising:
   obtaining a key value of the third DRB; and
   determining, based on the key value, the cell group in which the PDCP of the third DRB is located.

7. The method of claim 5, wherein the PDCP version of the third DRB is a long-term evolution (LTE) PDCP version or a new radio (NR) PDCP version.

8. The method of claim 5, wherein the default transmission path is used when the data duplication transmission function is in a deactivated state.

9. The method of claim 1 further comprising:
   determining, according to a preset rule, which of the DRBs corresponding to the first control information from a master node or the second control information from a secondary node.

10. The method of claim 9, wherein the preset rule further comprises one or more of the following:
    when the DRB has a first packet data convergence protocol (PDCP) version, the DRB is included in the first quantity of DRBs; or
    when the DRB has a second PDCP version, the DRB is included in the second quantity of DRBs.

11. A user equipment (UE) comprising:
    a processor; and
    a memory containing instructions that, when executed by the processor, cause the UE to:
    receive control information including first control information from a master node and/or second control information from a secondary node, the first control information including an indication of a first quantity of data radio bearers (DRBs), the second control information including an indication of a second quantity of DRBs; and
    determine, based on the first control information and/or the second control information, to open or close one or more data duplication and transmission functions of the DRBs, wherein the DRBs comprise at least one of a master cell bearer, a secondary cell bearer and a split bearer;
    wherein determining to open or close the one or more data duplication and transmission functions further comprises:
    when the first quantity of DRBs corresponding to the first control information includes a first DRB used as a master cell bearer, determining to open or close a data duplication transmission function of the first DRB based on an indication of the first control information wherein the first DRB is not included in the second quantity of DRBs; and
    when the second quantity of DRBs corresponding to the second control information includes a second DRB used as a secondary cell bearer, determining to open or close a data duplication transmission function of the second DRB based on an indication of the second control information, wherein the second DRB is not included in the first quantity of DRBs.

12. A non-transitory computer readable medium having stored thereon a computer program for controlling data duplication and transmission, the computer program comprising a program code which, when executed by a processor of a user equipment (UE), performs steps of a method comprising:

receiving control information including first control information from a master node and/or second control information from a secondary node, the first control information including an indication of a first quantity of data radio bearers (DRBs), the second control information including an indication of a second quantity of DRBs;

determining, based on the first control information and/or the second control information, to open or close one or more data duplication and transmission functions of the DRBs, wherein the DRBs comprise at least one of a master cell bearer, a secondary cell bearer and a split bearer;

wherein determining to open or close the one or more data duplication and transmission functions further comprises:

when the first quantity of DRBs corresponding to the first control information includes a first DRB used as a master cell bearer, determining to open or close a data duplication transmission function of the first DRB based on an indication of the first control information wherein the first DRB is not included in the second quantity of DRBs; and when the second quantity of DRBs corresponding to the second control information includes a second DRB used as a secondary cell bearer, determining to open or close a data duplication transmission function of the second DRB based on an indication of the second control information, wherein the second DRB is not included in the first quantity of DRBs.

* * * * *